(12) United States Patent
Pueblas

(10) Patent No.: US 11,765,059 B2
(45) Date of Patent: Sep. 19, 2023

(54) LEVERAGING OPERATION, ADMINISTRATION AND MAINTENANCE PROTOCOLS (OAM) TO ADD ETHERNET LEVEL INTELLIGENCE TO SOFTWARE-DEFINED WIDE AREA NETWORK (SD-WAN) FUNCTIONALITY

(71) Applicant: Fortinet, Inc., Sunnyvale, CA (US)

(72) Inventor: Martin C. Pueblas, Cutler Bay, FL (US)

(73) Assignee: Fortinet, Inc., Sunnyvale, CA (US)

( * ) Notice: Subject to any disclaimer, the term of this patent is extended or adjusted under 35 U.S.C. 154(b) by 12 days.

(21) Appl. No.: 17/136,250

(22) Filed: Dec. 29, 2020

(65) Prior Publication Data
US 2022/0210038 A1 Jun. 30, 2022

(51) Int. Cl.
| | | |
|---|---|---|
| H04L 43/0811 | (2022.01) | |
| H04L 47/2475 | (2022.01) | |
| H04L 41/0213 | (2022.01) | |
| H04L 41/0686 | (2022.01) | |
| H04L 45/302 | (2022.01) | |

(52) U.S. Cl.
CPC ...... *H04L 43/0811* (2013.01); *H04L 41/0213* (2013.01); *H04L 41/0686* (2013.01); *H04L 45/306* (2013.01); *H04L 47/2475* (2013.01)

(58) Field of Classification Search
CPC ..... H04L 45/64; H04L 12/4633; H04L 41/16; H04L 41/147; H04L 12/4641; H04L 45/38; H04L 41/12; H04L 43/08; H04L 45/22; H04L 41/5009; H04L 41/5019; H04L 45/302; H04W 28/0268; H04W 36/14; H04W 36/30; H04W 48/18; H04W 84/12; H04W 92/02; H04W 24/08; H04W 28/10; H04W 40/12
See application file for complete search history.

(56) References Cited

U.S. PATENT DOCUMENTS

| | | | |
|---|---|---|---|
| 2020/0162337 A1* | 5/2020 | Jain | H04L 41/50 |
| 2020/0322262 A1* | 10/2020 | Maino | H04L 67/10 |
| 2020/0351172 A1* | 11/2020 | Vasseur | H04L 41/147 |
| 2021/0067442 A1* | 3/2021 | Sundararajan | H04L 45/04 |

OTHER PUBLICATIONS

Etienne Martel, "How to Succeed With SD-WAN Using Virtualized Service Assurance", 2017 Fall Technical Forum, Oct. 17, 2017.

* cited by examiner

Primary Examiner — Khaled M Kassim
Assistant Examiner — Najeeb Ansari
(74) Attorney, Agent, or Firm — HDC Intellectual Property Law, LLP

(57) ABSTRACT

System and methods for enabling SD-WAN functionality to respond to Ethernet level OAM-related events are provided. According to an embodiment, a Software-Defined Network Wide Area Network (SD-WAN) module of a network device operating as both an SD-WAN node and a Maintenance Entity Group Endpoint (MEP) receives Operation, Administration and Maintenance (OAM) information via one of multiple OAM-enabled links of the network device. The SD-WAN module determines based on the OAM information, an event associated with the OAM network relating to one or more of service availability, Quality of Service (QoS), and service configuration, and based on the determined event, updates routing information to determine how to route application traffic over the OAM-enabled links.

20 Claims, 9 Drawing Sheets

LEVERAGING OPERATION, ADMINISTRATION AND MAINTENANCE PROTOCOLS (OAM) TO ADD ETHERNET LEVEL INTELLIGENCE TO SOFTWARE-DEFINED WIDE AREA NETWORK (SD-WAN) FUNCTIONALITY

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2020, Fortinet, Inc.

BACKGROUND

Field

Embodiments of the present disclosure generally relate to Software-Defined Wide Area Network (SD-WAN) and Operation, Administration & Maintenance (OAM) technologies. In particular, embodiments of the present disclosure relate to the integration of SD-WAN and OAM functionalities to improve the ability of an SD-WAN solution to detect and react to various events (e.g., service failures and quality-related conditions) by adding ethernet level intelligence into SD-WAN, thereby enhancing the application routing abilities of SD-WAN when operating on an Ethernet transport.

Description of the Related Art

SD-WAN simplifies the management and operation of a WAN by decoupling the networking hardware from its control mechanism. SD-WAN solutions are primarily designed to ensure the availability and performance of real-time and mission-critical applications over networks built on a combination of transport services, such as broadband Internet, Multi-Protocol Label Switching (MPLS), and Long-Term Evolution (LTE). To that end, SD-WAN solutions use a variety of mechanisms to monitor and measure the availability and performance of specific services and applications. SD-WAN monitoring and measurements currently operate at the Internet Protocol (IP) and upper layers of the Open Systems Interconnection (OSI) model. As a result, existing SD-WAN solutions do not have visibility into Ethernet level information (e.g., available at the data link layer of the OSI model).

SUMMARY

System and methods are described for enabling SD-WAN functionality to respond to Ethernet level OAM-related events. According to an embodiment, a Software-Defined Network Wide Area Network (SD-WAN) module of a network device, operating as both an SD-WAN node and a Maintenance Entity Group Endpoint (MEP), receives Operation, Administration and Maintenance (OAM) information via one of multiple OAM-enabled links of the network device. The SD-WAN module determines, based on the OAM information, an event associated with the OAM network, and based on the determined event, updates routing information to determine how to route application traffic over the OAM-enabled links.

Other features of embodiments of the present disclosure will be apparent from accompanying drawings and detailed description that follows.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

DETAILED DESCRIPTION

Figure 1:
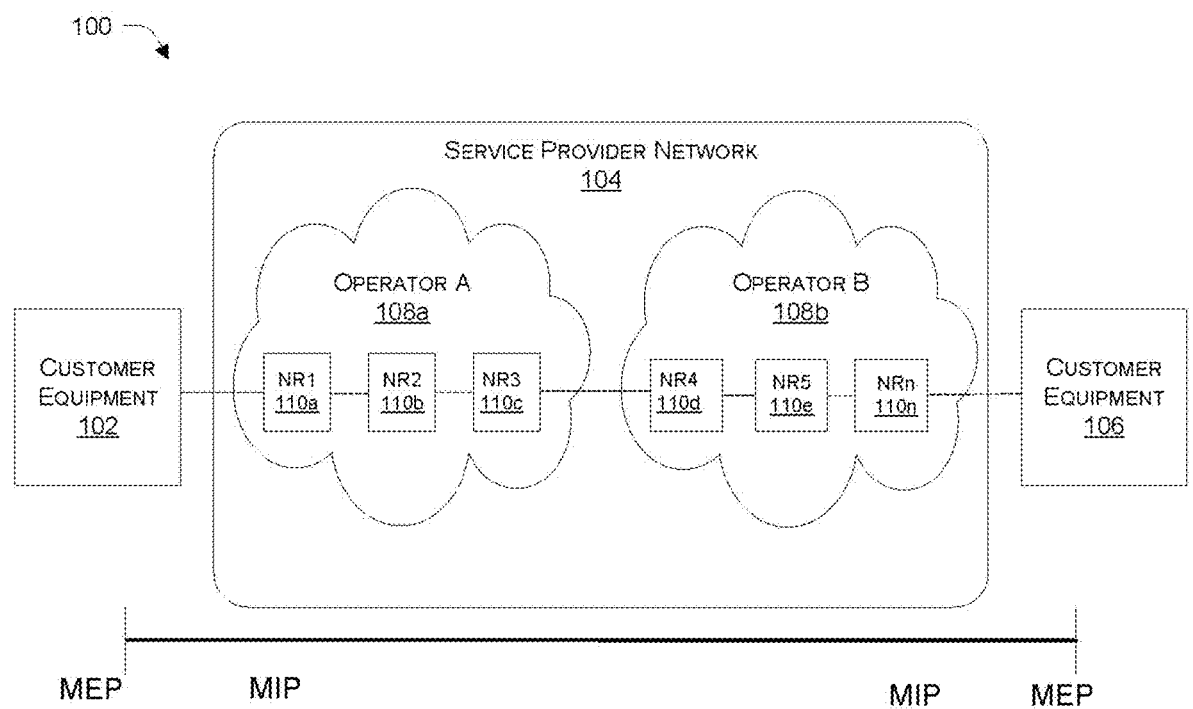
FIG. 1 conceptually illustrates an Operations, Administration, and Maintenance (OAM) network in accordance with an embodiment of the present disclosure.

System and methods are described for enabling SD-WAN functionality to respond to Ethernet level OAM-related events. As noted above, existing SD-WAN solutions do not have access to Ethernet level information (e.g., available at the data link layer of the OSI model). This limits the visibility and ability of existing SD-WAN solutions to quickly react to failures and changing conditions of the underlying transport, for example, when based on a Metro Ethernet service. As existing SD-WAN solutions are not designed to leverage the underlying protocols and capabilities of Metro Ethernet-based services, carriers offering SD- WAN over metro Ethernet are left to deal with two disconnected solutions, OAM functions and separate SD-WAN functionality. When errors occur at the Ethernet layer, the SD-WAN solution has no visibility, and as a result, cannot react in a timely manner or may not react at all, potentially requiring the carrier to intervene manually. This may affect the carrier's ability to meet its service level agreements (SLAs) contracted by the customers, as the solution cannot quickly and automatically respond to Ethernet level failures and changes in the quality of the service. For example, when an ethernet loop occurs, an SD-WAN node will continue sending traffic over the problematic link until the connection is completely degraded or until the node detects the problem via other means (e.g., IP and upper layers of the OSI model). Additionally, existing SD-WAN solutions have no way to detect configuration issues in Ethernet services. For example, existing SD-WAN solutions cannot detect provisioning of an Ethernet connection that is unexpected, unauthorized, or the configuration of duplicated services, which may lead to data leakage and/or service degradation.

As such, embodiments of the present disclosure seek to add ethernet level intelligence into SD-WAN to facilitate faster response to changing connectivity and performance conditions of an ethernet service and with more agility than that provided by existing SD-WAN monitoring and measurements that operate at the IP and upper-layers of the OSI model. Advantageously, this enables SD-WAN to more effectively route applications over appropriate links, improving carrier Service Level Agreements (SLAs) and the overall user experience.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program the computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other types of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within the single computer) and storage systems containing or having network access to a computer program(s) coded in accordance with various methods described herein, and the method steps of the disclosure could be accomplished by modules, routines, subroutines, or subparts of a computer program product.

In the following description, numerous specific details are set forth in order to provide a thorough understanding of example embodiments. It will be apparent, however, to one skilled in the art that embodiments described herein may be practiced without some of these specific details Terminology Brief definitions of terms used throughout this application are given below.

The terms "connected" or "coupled" and related terms are used in an operational sense and are not necessarily limited to a direct connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

If the specification states a component or feature "may," "can," "could," or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein, Operations, Administration & Maintenance (OAM) protocols generally refer to those protocols used by Metro Ethernet carriers for configuration validation, fault detection, performance monitoring, diagnostics, and troubleshooting. Non-limiting examples of current OAM protocols include IEE 802.3ah (Ethernet Link OAM), IEEE 802.1ag Connectivity Fault Management (CFM), and subsequent ITU-T G.8013/Y.1731 enhancements.

As used herein, an "event" is intended to broadly encompass any event, issue, and/or condition associated with an Operations, Administration & Maintenance (OAM) network that may influence the routing of SD-WAN traffic. Non-limiting examples of events include a status change of a peer Maintenance Entity Group Endpoint (MEP), detection of an error condition or fault, a change (e.g., improvement or decline) in performance measurements (e.g., latency, jitter, and/or packet losses) on a link, a change in the status (e.g., active or inactive) of a link, the addition or activation of a new link, identification of service misconfiguration, loss of connectivity to a location, a device failure, a data plane loop, disabling or removal of an MEP, a duplicate MEP, a missing MEP, an unknown MEP, a port or interface error, and a cross-connect.

As used herein, a "network device" generally refers to a device or appliance in virtual or physical form, which implements SD-WAN and OAM functions and that is operable to perform packet switching and/or routing to receive and forward data to a destination device. Non-limiting examples of network devices include switches, routers, and other network security appliances.

As used herein, a "network security appliance" or a "network security device" generally refers to a device or appliance in virtual or physical form that is operable to perform one or more security functions. Some network security devices may be implemented as general-purpose computers or servers with appropriate software operable to perform one or more security functions. Other network security devices may also include custom hardware (e.g., one or more custom Application-Specific Integrated Circuits (ASICs)). A network security device is typically associated with a particular network (e.g., a private enterprise network) on behalf of which it provides one or more security functions. The network security device may reside within the particular network that it is protecting, or network security may be provided as a service with the network security device residing in the cloud. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), and DoS attack detection appliances (e.g., the FORTIDDOS family of DoS attack detection and mitigation appliances). In various examples described herein, a network device or network security device may represent an MEP and maybe customer equipment (CE) device located at a customer premises.

FIG. 1 conceptually illustrates an Operations, Administration, and Maintenance (OAM) network 100 in accordance with an embodiment of the present disclosure. As shown in FIG. 1, a network device, for example, customer equipment 102 or customer equipment 106, which may be a router or a switch or other network device located at the customer premises, connects the customer network (not shown) with a service provider network 104 over a WAN Ethernet port.

The service provider network 104 may include multiple sub-networks, for example, a network of operator A 108a and a network of operator B 108b, and may provide seamless end-to-end connectivity between the customer equipment 102 and the customer equipment 106. The service provider network 104, may support a number of services via a number of network resources (e.g., NR1 110a, NR2 110b, NR4 110c, NR4 110d, NR5 110e, and NRn 110n (which may be collectively referred to herein as network resources 110). These network resources 110, which may include, servers, network devices, service components, and other network infrastructure, may experience adverse events, including service degradation, misconfiguration, link failures, and the like, which may impact the routing of SD-WAN traffic.

An SD-WAN module (not shown) implemented within the customer equipment 102 may use performance SLAs or health-checks to detect link failures, monitor link quality, and measure the performance of services and applications. As noted above, existing SD-WAN modules work at the IP and upper layers of the OSI model, and as such, they do not have visibility into the lower Ethernet layer, such as data link and physical layer. As such, today, carriers offering SD-WAN over metro Ethernet have to deal with two disconnected solutions, OAM functions, and separate SD-WAN functionality.

There are a number of common failure scenarios that today's SD-WAN solutions cannot handle properly or in a timely manner when operating on an Ethernet transport. For example, when Ethernet level service is lost, existing SD-WAN solutions rely on IP and upper-layer mechanisms to detect the connectivity problem (e.g., as a result of loss of connectivity to a location, device failure or other error conditions). Similarly, SD-WAN solutions today have no way to identify a loop at the Ethernet layer. SD-WAN nodes may also continue sending traffic over a failing link for some time, affecting SLAs and the customer experience. Existing SD-WAN solutions also lack an ability to detect service misconfiguration issues in the Ethernet service. For example, existing SD-WAN solutions cannot detect provisioning of an Ethernet connection that is unexpected, unauthorized, or the configuration of duplicated services, which may lead to a data leakage and/or service degradation.

In an embodiment, the SD-WAN module of the customer equipment 102 is configured to leverage various information and mechanisms available in OAM protocols, such as IEEE 802.1ag Connectivity Fault Management (CFM) and ITU Y.1731, to implement ethernet level Performance SLAs and health-checks. For example, separate, but interconnected, OAM and SD-WAN software or hardware modules may be implemented within customer equipment 102 and 106 or the OAM functionality may be integrated within an SD-WAN module. In this manner, the SD-WAN modules of the customer equipment 102 and 106 have access to ethernet level intelligence, thereby facilitating faster response to the changing connectivity and performance conditions of an ethernet service. The ethernet level visibility helps the customer equipment 102 and 106 more effectively route applications over appropriate links, improving the carrier SLA and the overall user experience.

The consumer equipment 102 and 106 may be operable to make use of OAM functions (e.g., CFM, and subsequent G.801/Y.1731 enhancements) and SD-WAN functionalities in a collective manner to make routing decisions. The customer equipment 102 and customer equipment 106 may operate as both an SD-WAN node and a Maintenance Entity Group Endpoint (MEP). The MEP may connect to a Maintenance Entity Group Intermediate Point (MIP) (e.g., NR1

110a) of the service provider network 104 to collect OAM information from different network resources. In some embodiments, customer equipment 102 and 106 may tightly integrate SD-WAN functionalities and OAM functionalities or may have respective separate SD-WAN modules and OAM modules that communicate via signaling and function calls as described further below.

In various examples described herein, an SD-WAN module of a consumer equipment 102, operating as both an SD-WAN node and a Maintenance Entity Group Endpoint (MEP), may receive OAM information via an OAM-enabled link of multiple OAM-enabled links. The SD-WAN module may further determine, based on the OAM information, an event associated with the OAM network, and based on the determined event, may update routing information to determine how to route application traffic over the OAM-enabled links.

Figure 2:
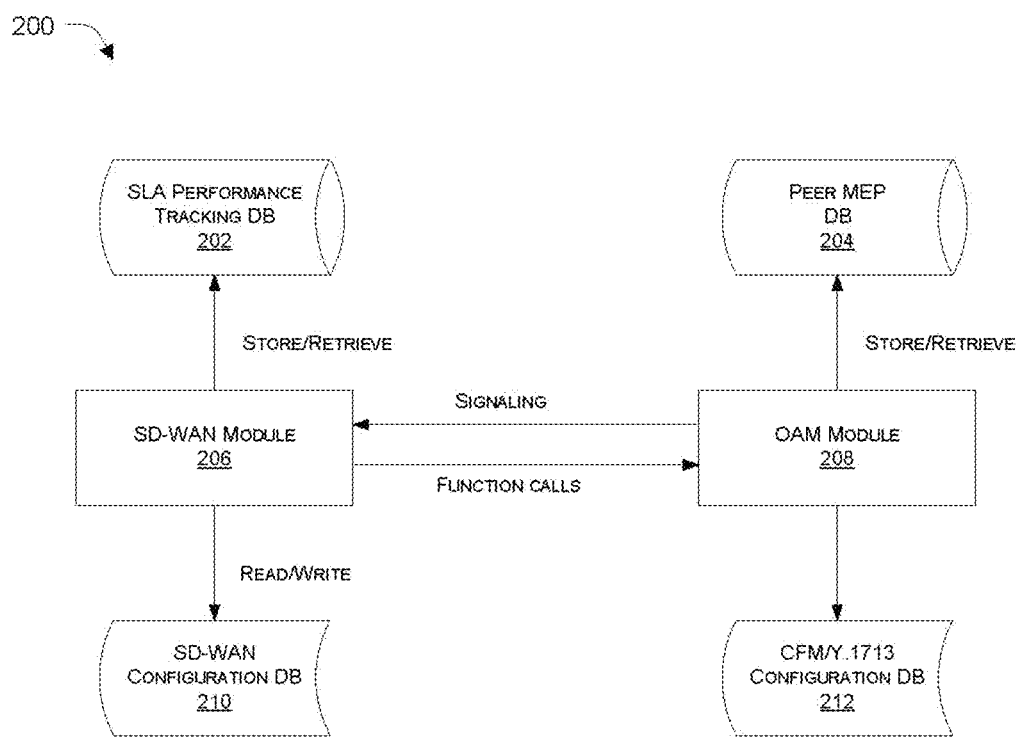
FIG. 2 illustrates an example of interactions between an SD-WAN module and an OAM module of a network device in accordance with an embodiment of the present disclosure.

FIG. 2 illustrates an example of interactions between an SD-WAN module 206 and an OAM module 208 of a network device 200 in accordance with an embodiment of the present disclosure. The SD-WAN module 206 provides routines and algorithms used to provide SD-WAN functionality, which may also be referred to herein as SD-WAN logic. The SD-WAN configuration may be stored in an SD-WAN configuration database (DB) 210, which is read and written by the SD-WAN module 206. At runtime, the SD-WAN module 206 may make use of a datastore (e.g., SLA performance tracking database 202) in memory or a storage device to store and retrieve information related to the execution of SD-WAN functions, such as the tracking of SLA parameters and performance measuring information.

The network device 200 (which may represent customer equipment 102 or customer equipment 106 of FIG. 1) also includes routines and algorithms for implementing the OAM functions within the OAM module 208. The OAM module 208 implements OAM functionalities, which may also be referred to herein as OAM logic. The OAM configuration may be stored in OAM configuration DB 212, which may be read and written by the OAM module 208. At runtime, the OAM module 208 may make use of a datastore (e.g., peer MEP database 204) to store and retrieve information related to the execution of OAM functions, such as information regarding peer MEPs.

In some embodiments, the OAM module 208 sends a signal to the SD-WAN module 206 when an event is detected and passes specific structured information. For example, OAM module 208 may signal the SD-WAN module 206 responsive to detecting a status change of a peer MEP or responsive to detection of an error condition. In other usage scenarios, the SD-WAN module 206 may trigger certain functionality provided by the OAM module 208 by making appropriate function calls to the OAM module 208. Responsive to receipt of a request (e.g., a function call) from the SD-WAN module 206, the OAM module 208 may execute the requested functionality and provide any resulting information to the SD-WAN module 206. For example, the SD-WAN module 206 may request the execution of a layer-2 ping (Ethernet loopback), and the OAM module 208 may perform that action and return the results of the layer-2 ping to the SD-WAN module 206.

According to one embodiment, the SD-WAN module 206 leverages IEEE 8021.ag CFM and ITU-T G.8013/Y.1731 continuity check or other Ethernet Continuity Check (ETH-CC) protocols to implement ethernet level SD-WAN performance SLAs, which may also be referred to herein as health checks. The SD-module 206 may receive OAM information indicative of an event relating to service availability, Quality of Service (QoS), and/or service configuration. The OAM information received via one of the OAM-enabled links may include performance measurement information associated with the link, status (e.g., a status change) of the link, status of a MIP of the OAM network, status of a peer MEP, a configuration issue, and/or information regarding addition or activation of a new OAM-enabled link.

In an embodiment, the SD-WAN module 206 tightly integrates OAM functionalities and receives the OAM information using the OAM functionalities. In some embodiments, the network device may include a separate OAM module 208, which may provide OAM information to the SD-WAN module 206 responsive to a request by the SD-WAN module 206 or responsive to detection of an event by the OAM module 208. Advantageously, a network device having the SD-WAN module 206 with visibility into OAM information as described herein may implement a number of ethernet level SD-WAN performance SLAs (health checks).

Loopback Based Performance SLA Processing

The network device 200 may implement a loopback based performance SLA by making use of an Ethernet Loopback (ETH-LB) function (e.g., a layer-2 ping), which may be useful for validating connectivity of the MEP with an MIP or another MEP over an ethernet service. The loopback function is also useful for measuring latency, jitter, and/or frame loss. A network device, such as a CFM/Y.1731 enabled CE device, may implement loopback as an executable on-demand command that sends probe Loopback Messages (LBMs) to test end-to-end connectivity to a target over an ethernet service. The target may be a peer MEP or an MIP identified by a Media Access Control (MAC) address and expected to be reachable over an ethernet-based service. Similar to an IP layer ping, when an MEP sends a loopback probe message, it expects a response (e.g., a loopback reply (LBR)). The lack of such a response signals a connectivity problem, which the SD-WAN module 206 may use to confirm the availability of the service and to measure packet loss. In addition, loopback messages may include timestamps that the SD-WAN module 206 may leverage for measuring round-trip delay and one-way jitter.

As those skilled in the art appreciate, Ethernet Loopback is a function that is part of the CFM/Y.1731 implementation. The SD-WAN module 206 of the present disclosure may use the Ethernet Loopback function implemented within the OAM module 208, for example, via a function call. Alternatively, in an embodiment in which the OAM logic is implemented within the SD-WAN module 206, the SD-WAN module 206 may simply invoke the locally implemented Ethernet Loopback function.

Whether the Ethernet Loopback function is implemented in an OAM module 208 or embedded into the SD-WAN module 206, the SD-WAN functionality allows the configuration of one or multiple loopback based performance SLAs. Each loopback based performance SLA allows configuration of one or more loopback based performance SLA parameters. In one embodiment, the Loopback based performance SLA parameters include those listed in Table 1 (below).

TABLE 1

Loopback based Performance SLA Parameters

| Parameter | Description |
| --- | --- |
| Destination Maintenance Point | MAC address of remote Maintenance Entity Group Endpoint (MEP) or Maintenance Entity Group Intermediate Point (MIP) |

TABLE 1-continued

Loopback based Performance SLA Parameters

| Parameter | Description |
|---|---|
| Maintenance Entity Group Level | OAM maintenance level (e.g., an integer between 0 and 7, inclusive |
| Link | Physical port or Virtual Local Area Network (VLAN) interface with OAM enabled, and over which loopback messages will be sent and received. In the SD-WAN logic, these are the member interfaces (links) used for application load balancing. |
| Check interval | Frequency of loopback probe messages, typically expressed in terms of an integer number of milliseconds |
| Probe timeout | Time to wait before a loopback probe message is considered unanswered, typically expressed in an integer number of milliseconds |
| Failures to inactive | Failed attempts, an integer number of missed loopback replies (LBRs) after which the link is considered inactive |
| Restore link after | An integer number of successful loopback exchanges before reactivating a link |

The SD-WAN performance SLA configuration may also provide an option for delay, jitter, and packet loss measurement configuration in case performance measurement is desired. The parameters for implementing such functions in accordance with an embodiment are described in Table 2 (below).

TABLE 2

Latency, Jitter, and Packet Loss Parameters

| Parameter | Description |
|---|---|
| Probe count | The number of most recent loopback probes (LBMs) to be used in the calculation of latency, jitter, and packet loss. |
| Latency threshold | The latency threshold value to take action on how to route traffic, typically expressed as an integer value of milliseconds |
| Jitter threshold | jitter threshold value to take any action on how to route traffic, typically expressed as an integer number of milliseconds |
| Packet loss threshold | Packet loss threshold expressed as an integer percentage value to take action on how to route traffic |

There are some other optional parameters, which depending upon the particular implementation, may be configured as part of the OAM service configuration. In one embodiment, the optional parameters include those described in Table 3 (below).

TABLE 3

Optional Parameters

| Parameter | Description |
|---|---|
| Include hostname as sender-id | A configurable option (e.g., enable or disable) to send the node's hostname as sender-id TLV in loopback messages. |
| Set Class of Service (CoS) | Set CoS bit value in 802.1Q VLAN header of loopback probe messages (e.g., an integer value in the range of 0 to 7, inclusive |

In an embodiment, the SD-WAN module 206 performs loopback based performance processing. As noted above, some of the operations and functions may be implemented in a separate OAM module (e.g., OAM module 208) or may alternatively be implemented by the SD-WAN module 208 itself. The network device 200 may send loopback probe messages (LBMs) at regular intervals set in the check interval parameter of the SLA configuration. LBMs should be directed to the destination maintenance point and should have the Maintenance Entity Group Level field in the message set as configured in the Maintenance Entity Group Level parameter of the SLA configuration. Loopback probe messages (LBMs) may include a transaction identifier (ID) used to identify each loopback message exchange. The network device 200 listens for loopback replies (LBRs). Upon receipt of the LBRs, the network device 200 may confirm the validity of each loopback reply message by confirming the Maintenance Entity Group Level and Transaction ID fields contained in the LBR message match those of the original loopback message (LBM). If no valid loopback reply (LBR) is received within the time period set by the probe timeout parameter, the SD-WAN logic should consider the probe attempt as failed.

In accordance with one embodiment, whenever the number of failed attempts in a row reaches the value set in the failures to inactive parameter, the SD-WAN logic will consider the link as inactive, and therefore removes the routes on that link from the load balancing group, so traffic is routed over the remaining links. Similarly, the SD-WAN logic should reinstate the previously removed route on that link responsive to the loopback exchanges resuming successfully for the number of sequential attempts set in the restore link after parameter. In an embodiment, a threshold can be set for the number of successful sequential attempts for which a link can be included in the load balancing group. Similarly, a threshold can be set for a number of failed attempts, after which a link can be removed from the load balancing group.

The SD-WAN module 206 may calculate latency, jitter, and packet loss as loopback replay messages (LBRs) are received. Packet loss may be calculated as the percentage of loopback probes (LBMs) that went without a loopback reply (LBR). This percentage calculation may be based on the number of most recent probes set by the probe count parameter. Latency can be calculated by comparing the time of transition of a loopback probe (LBM) with the time of reception of its corresponding reply (LBR). Jitter can be calculated as the variation of the delay values of the most recent probe exchanges. As explained previously, LBM and LBR pairs may be identified by matching Maintenance Entity Group Level and transaction IDs.

Latency, jitter, and packet loss measurements may be used by the SD-WAN module 206 to decide how to best route application traffic over the available links. For instance, the SD-WAN logic may support the definition of rules to route certain application traffic to the link with the lowest latency.

Continuity Check Based Performance SLA

In an embodiment, the network device may implement one or more continuity check based performance SLAs. In OAM environments, MEPs transmit periodic Ethernet Continuity Check (ETH-CC) multicast messages to advertise their service instances to other endpoints in the same maintenance domain and VLAN. At the same time, MEPs create a catalog or database with the information contained in the continuity check messages sent by peer MEPs. The exchange of continuity check messages allows for the identification of service misconfiguration, loss of connectivity to a location, device failure, data plane loops, and other error conditions. These functions can be implemented by the OAM module 208 or the SD-WAN module 206 itself.

According to one embodiment, the OAM module 208 is configured to signal the SD-WAN module 206 on status changes and continuity check events. In this manner, the SD-WAN logic is able to quickly identify and respond to connectivity issues.

The Ethernet Continuity Check (ETH-CC) may be set up as part of the OAM configuration. Most parameters used for a continuity check based performance SLA can be extracted from the OAM configuration. The configuration typically involves the definition of the local MEPs (local to the node), and in certain cases, the static configuration of peer EPs. In some implementations, the node automatically adds to the configuration the peer MEPs it learns from the continuity check messages it receives. Various other configuration parameters that may be configured within the SD-WAN module 206 are described further below.

Depending upon the particular implementation, OAM configuration parameters may be part of the OAM service configuration or may be specified in the configuration of an SD-WAN performance SLA. In one embodiment, the OAM configuration parameters include those listed in Table 4 (below).

TABLE 4

Configuration Parameters for Continuity Check Based Performance SLAs

| Parameter | Description |
|---|---|
| Maintenance Entity Group (MEG) Domain Name | OAM domain name, Maintenance Domain Identifier (MDID) (e.g., a string of less than or equal to 154 bytes) |
| MEG Level | An OAM maintenance level, typically an integer value between 0 and 7, inclusive |
| Service Name | MEG ID, Service short Maintenance Association Name (MAID). The domain name and short MA name (e.g., a string of less than or equal to 48 bytes) |
| Local MEP ID | The ID of the local MEP, typically an integer value between 1 and 8191, inclusive |
| Link | Physical port or VLAN interface with CFM enabled, and where Continuity Check messages are sent and received. In the SD-WAN logic, these are the member interfaces (links) used for application load balancing. |
| Continuity check message interval | message frequency interval (e.g., 10 minutes, 1 minute, 10 seconds, 1 second, 100 milliseconds, 10 milliseconds, or 3.3 milliseconds) |
| Cross-check timeout | Cross-check is an optional function that verifies that all the expected MEPs in service are operational. The cross-check timeout defines the amount of time, often in an integer number of seconds. The node waits to hear continuity-check messages from a statically configured peer MEP before considering it dead. |
| Include hostname as sender-id | Provides a configurable option to send the node's hostname as sender-id TLV in continuity check messages (e.g., enable or disable) |
| Set CoS | Set Class of service (CoS) bit value in 802.1Q VLAN header of continuity check messages, typically an integer value between 0 and 7, inclusive |

In addition to the above common OAM configuration parameters, other SD-WAN SLA configuration parameters can also be configured. The continuity check protocol may be capable of signaling a number of error conditions under which a link may not be desirable for forwarding traffic. In one embodiment, the Continuity Check based performance SLA allows for the configuration of an action when error conditions are detected. The SD-WAN module 206 may use a single parameter related to the continuity check protocol to set an action when an error condition occurs, or this may be broken up into multiple parameters, one action per error condition. In the single parameter option, a link may be considered failed whenever an error is detected despite the specific condition. When the SD-WAN module 206 detects a failed continuity check error, it may remove the route on the link whenever any error condition is detected. Alternatively, using separate parameters per continuity check error condition, the SD-WAN module 206 may perform more granular actions per error condition.

TABLE 5

SD-WAN SLA Configuration Parameters

| Parameter | Description |
|---|---|
| Peer MEP ID | The ID of the peer MEP used as a target for the SLA (e.g., an integer value in the range of 1 to 8191, inclusive) |
| Fail with continuity check error | Remove route on the link whenever an error condition is detected (e.g., enable or disable) |
| Separate parameter per continuity check error condition | This option provides more granular actions per error condition. Below are some non-limiting examples for common error conditions. |
| Fail when loop detected | Remove route on the link when a loop is detected (e.g., enable or disable). A forwarding loop is identified when the local MEP receives a Continuity Check message with its own source MAC address and MEP ID. |
| Fail with cross-connect | Remove route on the link when a cross-connect is detected (e.g., enable or disable). This condition may be detected when the local MEP receives a Continuity Check message with an incorrect MEP ID, or MAID different from the one of the local MEP. |
| Fail with duplicate MEP | Remove route on the link when a duplicate MEP is detected (e.g., enable or disable). This condition is detected when the local MEP receives a Continuity Check message with the same MEP ID as the local MEP, typically due to a misconfiguration (e.g., the administrator reused the same MEP ID at two locations). |
| Fail with missing MEP | Remove route on the link when no Continuity Check messages are received from a statically configured peer MEP within the cross-check timeout (e.g., enable or disable), and when crosscheck is enabled in the OAM configuration. |
| Fail with unknown MEP | Remove route on the link when a Continuity Check message is received from a peer MEP that has not been statically configured (e.g., enable or disable), and when crosscheck is enabled in the OAM configuration. Typically this condition is another indication of a potential misconfiguration. |
| Fail with Port/Interface Status | Remove route on the link when a Continuity Check message indicates a Port or Interface error (e.g., enable or disable). Port and Interface status are reported in TLV fields within the continuity check message. |

In an embodiment, the OAM module 208 may perform continuity check based performance SLA processing based on the parameters described above in Tables 4 and 5. In accordance with the CFM/Y.1731 protocol, MEPs exchange Continuity Check (ETH-CC) messages to advertise their service instances and to learn from other endpoints in the same maintenance domain and VLAN. To that end, MEPs send continuity check messages at regular intervals, in accordance with the frequency defined by the Continuity check message interval parameter. These messages are sent over multicast and are expected to be received by all the other MEPs, including the network device implementing the OAM module 208, in the same maintenance domain. At the same time, MEPs listen for incoming continuity check messages, which are used to maintain a peer MEP database (e.g., Peer MEP DB 204) with the information learned from the messages sent by other MEPs.

The network device, operating as an MEP, parses the continuity check messages to verify their validity. Valid messages are those that contain the correct Service Name (MEG ID/MAID) and Maintenance Level, and that include the MEP ID of an expected peer MEP. Continuity check messages may also signal error conditions, like the ones listed in Table 5. In one embodiment, when an error condition is detected, the OAM module 208 updates the database accordingly and signals the error to the SD-WAN module 206 (e.g., via a Syslog or other mechanism). If a Continuity Check based Performance SLA is configured for the service in question, the SD-WAN logic is operable to react according to the SLA configuration. For instance, if the Continuity Check based Performance SLA is configured with the Fail when loop detected parameter enabled, and a loop error condition is signaled by the OAM module 208, the SD-WAN logic should treat the SLA associated link as inactive, and therefore remove the routes on that link from the load balancing group, so traffic is routed through other links. In embodiments, the OAM module 208 also signals the SD-WAN module 206 whenever an error condition is cleared, so the SD-WAN logic is given an opportunity to react accordingly. For instance, in the context of the previous example, by reinstating the previously removed routes on the link to allow traffic.

Per the CFM/Y.1731 protocol, MEPs should keep track of the continuity check message activity of peer MEPs. When an MEP does not receive a continuity check message from a peer MEP within an interval of 3.5 times the Continuity check message interval parameter, the peer MEP should be considered to have lost continuity. As a result, the OAM module 208 should update the status of the peer MEP in the database as inactive (DOWN) and send a Syslog or other type of notification, if configured to do so. The OAM module also signals the status change to inactive (DOWN) to the SD-WAN module 206 to integrate the OAM functionality with SD-WAN. If a Continuity Check based Performance SLA is configured for the service in question, the SD-WAN logic should treat the SLA associated link as inactive, and therefore remove the routes on that link from the load balancing group, so traffic is routed through other links. Likewise, when the continuity checks messages from a peer MEP resume, the OAM module 208 should change the status of the peer MEP as active (UP), updating the peer MEP database, and generating Syslog or other type of notification, if configured to do so. In one embodiment, the integration of OAM with SD-WAN includes the OAM module 208 signaling the SD-WAN module 206 every time the status of a peer MEP changes to active (UP). In response, the SD-WAN logic should reinstate the previously removed route on that link to allow traffic. Whenever a peer MEP is disabled or removed from the OAM service configuration, corresponding to a configured continuity check performance SLA, the OAM module 208 should signal the SD-WAN module 206 so that it can remove the routes on that link from the load balancing group and route traffic through other links. Likewise, when a peer MEP is enabled and corresponds to a continuity check performance SLA, the OAM module 208 should signal the SD-WAN module 206 so that it reinstates the route on the link as soon as the MEP is reenabled and as long as the other SLA conditions are met.

International Telecommunication Union (ITU) Y.1731 Extensions

The SD-WAN module 206 may use multicast Loopback (multicast ETH-LB), Frame Delay and Loss Measurement, and other functionality of ITU Y.1731 to enhance the integration with SD-WAN by complementing the functionality provided by CFM.

Multicast Ethernet Loopback is a function that is part of the Y.1731 implementation. In an embodiment, the SD-WAN module 206 may use the Multicast Ethernet Loopback function present in the OAM module 208 via a function call. Alternatively, SD-WAN module 206 may include these functions. Multicast loopback (Multicast ETH-LB) is an L2 ping but in multicast, which allows testing the connectivity of an MEP with all other service endpoints (MEPs) on the same Ethernet service.

The SD-WAN module 206 may include SD-WAN configurable parameters for multicast loopback based performance SLA. A multicast loopback-based SLA may use most of the same parameters as a loopback SLA (see, e.g., Table 1), buy may also include the additional parameters described below in Table 6. As those skilled in the art will appreciate, latency, jitter, and packet loss parameters are not needed in this scenario as they are covered by the Y.1731 performance management functions.

TABLE 6

SD-WAN SLA Configuration Parameters for a Multicast Loopback based Performance SLA

| Parameter | Description |
| --- | --- |
| Multicast loopback | Indicates whether this SLA is multicast-based (e.g., enable or disable) |
| Expected Destination Maintenance Point | Indicates if a response is expected from any peer MEP or from all MEPs in a list (e.g., any or all). |
| Destination Maintenance Point List | List of MAC addresses of the expected peer MEPs or MIPs. This parameter should be used when the Expected Destination Maintenance Point parameter is to "all." |

In an embodiment, the SD-WAN module 206 may perform multicast loopback based performance SLA processing. The processing of multicast loopback SLA is similar to that described above for unicast loopback based performance SLA processing. According to one embodiment, the OAM module 208 or the SD-WAN module 206 itself may perform the operations and functions as described below.

The network device 200 implementing multicast loopback based performance SLA may send loopback probe messages (LBMs) at regular intervals, set in the check interval parameter of the SLA configuration. The LBMs should be directed to the appropriate multicast destination address (e.g., Multicast Class 1 DA) and should have the MEG level packet field set as configured in the MEG Entity level parameter for the SLA configuration. As above, loopback probe messages (LBMs) include a transaction ID used to identify each loopback message exchange.

The network device 200 listens for loopback replies (LBRs), which are expected to arrive in unicast frames. Upon reception, the node confirms the validity of each loopback reply message by comparing the Transaction ID field contained in the LBR message to that of the original loopback message (LBMs) sent.

SD-WAN module 206 may define two possible criteria for considering a probing attempt successful, configurable by the Expected Destination Maintenance Point parameter. With the parameter set to "any," a loopback probe attempt may be considered successful as long as a valid reply (LBR) from any peer MEP arrives within the time set by the probe timeout parameter. With the parameter set to "all," a probing attempt should be considered successful only if a valid reply (LBR) is received from each and every peer MEP statically listed and within the time set by the probe timeout parameter.

In the context of the present example, the SD-WAN module 206 defines two possible criteria for considering a probing attempt failed, configurable by the Expected Destination Maintenance Point parameter. When the Expected Destination Maintenance Point parameter is set to "any," a probing attempt will be considered failed when no valid replies (LBRs) are received from any MEP within the time set by the probe timeout parameter. Once a probing attempt fails, the SD-WAN logic should treat the link as inactive, and therefore remove the routes on that link from the load balancing group, so traffic gets routed through other links. The SD-WAN logic should reinstate the previously removed route on that link as soon as loopback probes successfully resume for the number of sequential attempts set in restore link after parameter.

When the Expected Destination Maintenance Point parameter is set to "all," a probing attempt will be considered failed whenever a valid reply (LBRs) is not received by one or more of the MEPs configured in the static list, defined in Destination Maintenance Point List. Once a probing attempt fails, the SD-WAN logic should treat the link as inactive, and therefore remove the routes on that link from the load balancing group, so traffic gets routed through other links. The SD-WAN logic should reinstate the previously removed route on that link as soon as loopback probes successfully resume for the number of sequential attempts set in restore link after parameter.

In an embodiment, the SD-WAN module 206 may implement one or more ITU Y.1731 performance-based SLAs. The ITU Y.1731 performance management functions, such as ethernet synthetic loss and ethernet delay measurements, allow the measurement of one way and two way round trip latency, unidirectional jitter, and frame loss, all of which could be used in SD-WAN Performance SLAs. The operations and functions, such as Ethernet Synthetic Loss measurement (ETH-SLM), and Ethernet Delay Measurement (ETH-DM) defined here, can be called from an OAM module 208 or could be alternatively implemented by the SD-WAN module itself.

As defined in ITU Y.1731, MEPs may implement Ethernet synthetic loss measurement (ETH-SLM) to measure frame loss on-demand. The ETH-SLM mechanism uses synthetic frames to measure frame loss rather than regular data frames. With ETH-SLM, MEPs exchange a series of synthetic frames containing ETH-SLM information while maintaining a pair of counters in a memory structure to keep track of the frames transmitted (TxFCl) and received (RxFCl) between a set of MEPs.

In an embodiment, the node (implementing SD-WAN functionality and OAM functionality) may use single-ended ETH-SLM, which provides an on-demand mechanism for measuring packet loss. Even though the Dual-ended ETH-SLM is not described, one will appreciate that the SD-WAN module 206 may implement Dual-ended ETH-SLM based Performance SLAs in a similar manner.

According to one embodiment, the SD-WAN module 208 allows for the configuration of one or multiple ETH-SLM based performance SLAs based on the parameters described in Table 7 (below).

TABLE 7

SD-WAN SLA Configuration Parameters
for ETH-SLM based Performance SLA

| Parameter | Description |
| --- | --- |
| Destination Maintenance Point | The MAC-address of remote MEP or MIP |
| MEG Level | An OAM maintenance level, typically an integer value between 0 and 7, inclusive |
| Link | The physical port or VLAN interface where the ETH-SLM messages will be sent and received. In the SD-WAN logic, these are the member interfaces (links) used for application load balancing. |
| ETH-SLM message interval | The transmission frequency of Synthetic Loss Messages (SLMs) frames, usually expressed in an integer number of seconds |
| Probe count | The number of SLMs that should be generated to calculate packet loss. |
| Probe timeout | Time to wait before a loopback probe message is considered unanswered, typically expressed in an integer number of seconds (e.g., 5 seconds as specified in ITU-T G.8021) |
| Packet loss threshold | Packet loss threshold expressed as an integer percentage value to take action on how to route traffic |

The SD-WAN module 206 may perform ETH-SLM based performance SLA processing. The operations and functions described below may be called from the OAM module 208 or may be alternatively implemented within the SD-WAN module 206.

The node implementing this functionality should send Synthetic Loss Messages (SLMs) at regular intervals set in the ETH-SLM message interval parameter of the SLA configuration. SLMs should be directed to the destination maintenance point (represented by its MAC address) and should have the MEG level field in the message set as configured in the MEG level parameter in the SLA configuration. SLMs should also include a unique Test ID identifying the measurement instance and the value of the transmit counter (TxFCl) at the time of transmission.

After sending an SLM, the node (MEP) expects to receive a valid Synthetic Loss Reply (SLR) within a preconfigured time set by the probe timeout parameter (e.g., 5 seconds), as specified in ITU-T G.8021, after which the message is discarded. A valid SLR is one that contains the correct MEG level, and in which the destination MAC address is the one of the requesting MEP. SLR frames contain the value of the received counter (RxFCl) at the time of transmission.

As defined by ITU Y.1731, the node (MEP) may calculate the near-end and far-end synthetic frame loss measurements with the information contained in the first and last received SLR frames. The SD-WAN module 206 may use the frame loss measurements to decide how to best route application traffic over the available links. For instance, the SD-WAN logic may support the definition of rules to route certain application traffic to the link with the lowest frame loss.

In an embodiment, the node may use the Ethernet Delay Measurement (EHT-DM) function for measuring frame delay and frame delay variation (also referred to as jitter). As defined in ITU Y.1731, MEPs may implement Ethernet delay measurement (ETH-DM) for measuring frame delay and frame delay variation (jitter) on-demand. With ETH-DM, MEPs exchange a series of frames containing ETH-DM information, which each MEP uses to calculate frame delay and frame delay variation. As one will appreciate, the node uses single-ended ETH-DM, which facilitates two-way frame delay and two-way frame delay variation measurements. Dual-ended ETH-DM is out of the scope of this document but could be leveraged by SD-WAN Performance SLAs in a similar manner. Dual-ended ETH-DM facilitates the calculation of one-way frame delay and one-way frame delay variation. In one embodiment, the SD-WAN module 206 allows for configuration of one or multiple ETH-DM based performance SLAs based on the parameters described in Table 8 below.

TABLE 8

SD-WAN SLA Configuration Parameters for ETH-DM based Performance SLA

| Parameter | Description |
| --- | --- |
| Destination Maintenance Point | The MAC-address of the remote MEP or MIP |
| MEG Level | An OAM maintenance level, typically an integer value between 0 and 7, inclusive |
| Link | The physical port or VLAN interface where the ETH-DM messages will be sent and received. In the SD-WAN logic, these are the member interfaces (links) used for application load balancing. |
| ETH-DM message interval | The transmission frequency of Delay Measurement Message (DMM) frames, usually expressed in an integer number of seconds |
| Probe count | The number of DMMs that should be generated to calculate delay and delay variation. |
| Probe timeout | Time to wait before a loopback probe message is considered unanswered, typically expressed in an integer number of seconds (e.g., 5 seconds as specified in ITU-T G.8021) |
| Delay threshold | The latency threshold value to take action on how to route traffic, typically expressed in an integer number of milliseconds |
| Delay Variation threshold | The jitter threshold value to take any action on how to route traffic, typically expressed in an integer number of milliseconds |

In an embodiment, the node may perform ETH-DM-based performance SLA processing. The operations and functions described below can be called from an OAM module 208 or could be alternatively implemented by the SD-WAN module 206 itself.

The node implementing this functionality should send Delay Measurement Messages (DMMNs) at regular intervals set in the ETH-DM message interval parameter of the SLA configuration. DMMs should be directed to the destination maintenance point (represented by its MAC address) and should have the Maintenance Entity Group Level field in the message set as configured in the Maintenance Entity Group Level parameter in the SLA configuration. DMMs must include the timestamp value at the transmission time of the ETH-DM frame (TxTimeStampf) and may include a unique Test ID identifying the measurement instance.

After sending a DMM, the node (MEP) expects to receive a valid Delay Measurement Reply (DMR) within a preconfigured time set by the probe timeout parameter (e.g., 5 seconds), as specified in ITU-T G.8021, after which the message is discarded. A valid DMR is one that contains the correct MEG level, and which destination MAC address is the one of the requesting MEP, and contains a matching Test ID if included. DMR frames contain the value of the TxTimeStampf timestamp used by the receiving MEP to calculate the frame delay. The receiving MEP may also measure two-way frame delay variation by compering two subsequent two-way frame delay measurements.

The SD-WAN module 206 may use the frame delay and frame delay variation measurements to decide how to best route application traffic over the available links. For instance, if the SD-WAN logic may support the definition of rules to route certain application traffic to the link with the lowest latency.

Figure 3:
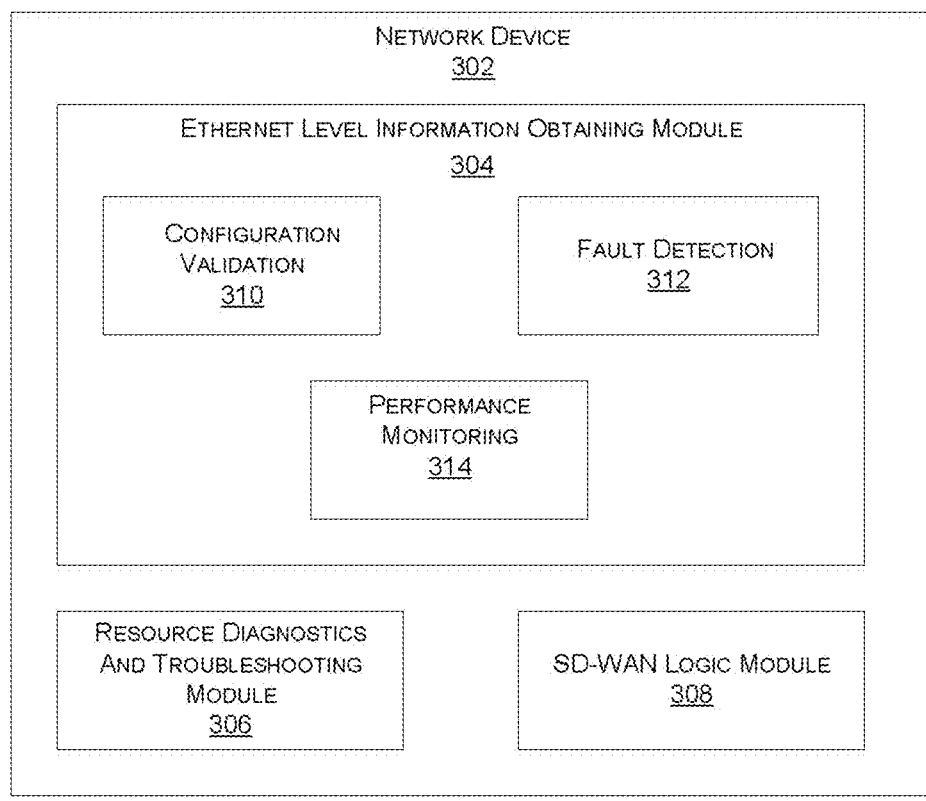
FIG. 3 illustrates functional modules of a network device having an SD-WAN module configured to obtain and respond to events detected based on Ethernet level information collected using OAM protocols in accordance with an embodiment of the present disclosure.

FIG. 3 illustrates functional modules of a network device 302 having an SD-WAN module configured to obtain and respond to events detected based on Ethernet level information collected using OAM protocols in accordance with an embodiment of the present disclosure. As shown in FIG. 3, the network device 302 includes an Ethernet level information obtaining module 304, a resource diagnostics and troubleshooting module 306, and an SD-WAN logic module 308. Functions associated with these modules (module 304, module 306, and module 308) can be implemented by an SD-WAN module (not shown in FIG. 3) itself or some specific functions, such as Ethernet level configuration validation 310, fault detection 312, and performance monitoring 314 can be performed by an OAM module (not shown in FIG. 3).

In an embodiment, the ethernet level information obtaining module 304 of the network device 302, which operates as both an SD-WAN node and an MEP, receives OAM information via one of multiple OAM-enabled links of the network device that are connected to an OAM network. The OAM information may include service availability, Quality of Service (QoS), and service configuration information. The resource diagnostics and troubleshooting module 306 determines, based on the OAM information, an event associated with the OAM network that may relate to service availability, Quality of Service (QoS), and service configuration. The resource diagnostics and troubleshooting module 306 may similarly get IP and upper-layer diagnostics and troubleshooting event information through SD-WAN functions. The network device 302 includes an SD-WAN logic module 208, which updates based on the event, routing information used by the SD-WAN module to determine how to route application traffic over the plurality of OAM-enabled links.

Based on the received OAM information and detected event, the SD-WAN logic module 308 may include a link within the load balancing group and/or remove a link from the load balancing group for forwarding the packets. As described above, the SD-WAN logic module 308 may include multiple configurable parameters associated with different SLAs and apply the OAM information to take dynamically adjustable routing decisions.

The event determined by the resource diagnostics and troubleshooting module 306 may relate to service availability, Quality of Service (QoS), and service configuration. The ethernet level information, obtained through an OAM protocol, referred interchangeably throughout this document as OAM information, includes a performance measurement information associated with the link, a status change of the link, status change of a Maintenance Entity Group Intermediate Point (MIP) of the OAM network, or status change of a peer MEP, a configuration issue, and addition or activation of a new link to the plurality of OAM-enabled links.

In an embodiment, the SD-WAN logic module 308 may tightly integrate OAM functionalities, such as configuration validation, fault detection, and performance monitoring, and receive the OAM information using the OAM functionalities. In some embodiments, the network device 302 may include an OAM module, which may provide OAM information to the SD-WAN module on request or as soon as an event is detected. The SD-WAN module may receive the OAM information from the OAM module via a periodic check message (e.g., keepalives) or responsive to a function call (e.g., loopback check, performance management functions, etc.) issued by the SD-WAN module to the OAM module. The function call, for example, may cause the OAM module to test connectivity of the MEP with a MIP of the OAM network or with a peer MEP via an OAM-enabled link. The function calls, in another example, may cause the OAM module to measure latency, jitter, and frame loss on the link by performing a loopback check (ETH-LB, or Multi ETH-LB) and/or by performing a performance management function. The OAM module may use Y1731 performance management functions (e.g., Ethernet Synthetic Loss Measurement (ETH-SLM), Ethernet Delay Measurement (ETH-DM), etc.) to check the link quality. The OAM module may identify a service misconfiguration and check for loss of connectivity to a location, a device failure, or a data plane loop by performing a continuity check. The OAM information is received by the SD-WAN module as a result of proactive monitoring performed by the OAM module, which may pass this information to the SD-WAN via signaling.

The OAM network may implement one or more of a current or future version of Institute of Electrical and Electronics Engineers (IEEE) 802.1ag Connectivity Fault Management (CFM) protocol or International Telecommunication Union (ITU) Y.1731 protocol, IEEE 802.3ah, and/or MEF Ethernet Location Management Interface (E-LMI). In some embodiments, the ITU Y.1731 protocol is used for any or combination of Alarm Indication Signal (AIS), Ethernet Lock Signal (LCK), check multicast loopback, measure frame delay, and perform loss measurement using Y.1731 performance management functions. In some embodiments, the OAM information is used by the SD-WAN module to enhance performance service level agreements (SLAs) and health-checks.

Figure 4:
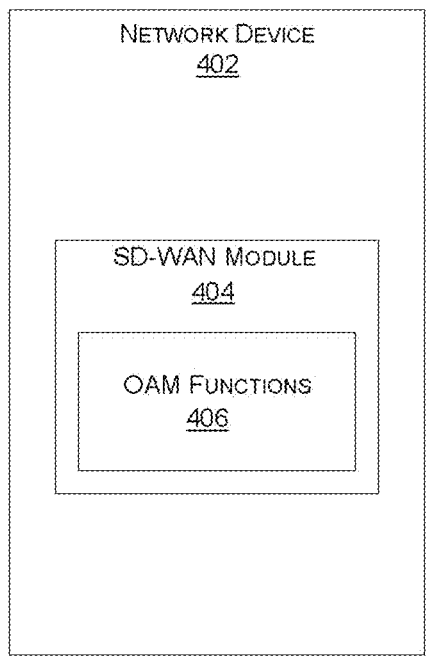
FIG. 4A is a block diagram illustrating an example integration of OAM functionalities within an SD-WAN module in accordance with an embodiment of the present disclosure.
FIG. 4B is a block diagram illustrating an example arrangement of an SD-WAN module and the OAM module in accordance with an embodiment of the present disclosure.
Figure 4:
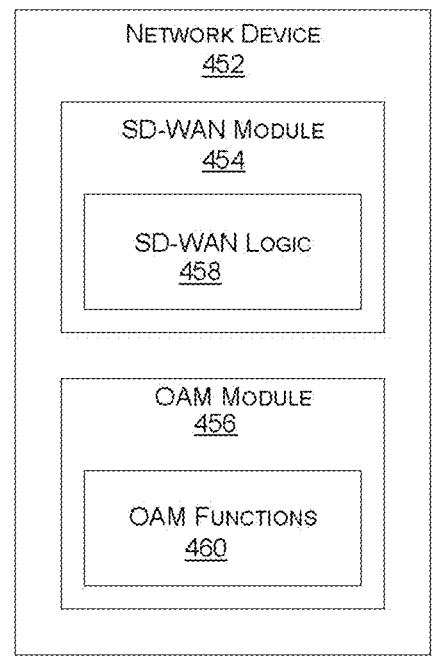

FIG. 4A is a block diagram illustrating an example integration of OAM functionalities within the SD-WAN module 404 in accordance with an embodiment of the present disclosure. As shown in FIG. 4A, the SD-WAN module 404 of a network device 402 (which may correspond to network device 302) may include OAM functions 406 (e.g., service availability, Quality of Service (QoS), and service configuration detection related functions). The OAM functions 406 may also include configuration validation functions, fault detection functions, and performance monitoring functions for obtaining OAM information. As those skilled in the art will appreciate, the SD-WAN module 404 may have other functions to obtain similar information from the IP layer and upper layers of the OSI model; however, with the integration of the OAM functions 406, the SD-WAN module 404 becomes more responsive to ethernet level events.

FIG. 4B is a block diagram illustrating an example arrangement of an SD-WAN 454 module and an OAM module 456 in accordance with an embodiment of the present disclosure. As shown in FIG. 4B, OAM functions 460 may be managed by a separate OAM module 456. The SD-WAN module 454 may continuously receive OAM information (Ethernet level information) from OAM module 456 or may receive the OAM information on request through a function call. SD-WAN module 454 may apply SD-WAN logic 458 based on both the OAM information and IP and upper-layer diagnostics and troubleshooting event information.

Figure 5:
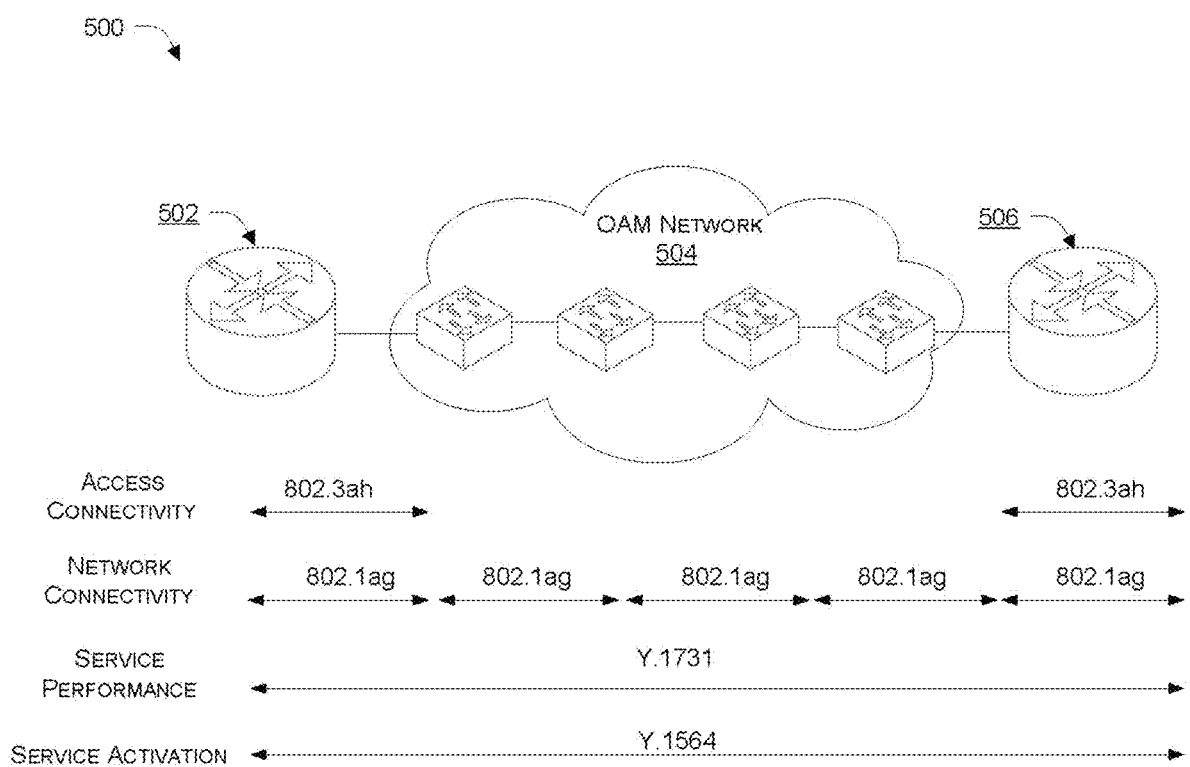
FIG. 5 is a block diagram illustrating the usage of suitable OAM protocols for obtaining different Ethernet level information in accordance with an embodiment of the present disclosure.

FIG. 5 is a block diagram illustrating the usage of suitable OAM protocols for obtaining different Ethernet level information in accordance with an embodiment of the present disclosure. SD-WAN module of a node (e.g., 502 or 506), which may be an MEP, may leverage standard Ethernet OAM capabilities to enable network providers to provision and operate their networks with full visibility and control, simply and efficiently to minimize ongoing OPEX. The node 502 may use access, link, test, and performance management capabilities developed by ITU-T and IETF. The visibility to OAM information provides additional functions to deal with L2 aspects of Ethernet services in an efficient manner. The node 502 and node 506, to obtain the OAM information from the OAM network 504, may use OAM standards such as CFM as defined by IEEE 802.1ag and its successors, Ethernet OAM (Fault and Performance) as defined in ITU-T Y.1731, Ethernet in the First Mile (EFM) Link OAM as defined in IEEE 802.3ah and their successors. The node 502 and node 506 may use IEEE 802.3ah to discover, monitor and/or asess connectivity in the First Mile. The node 502 and node 506 may use IEEE 802.1ag for determining network connectivity between the MEP and MIP and between MIPs. The IEEE 802.1ag protocols enable Ethernet services to be partitioned into maintenance domains with maintenance endpoints (MEP) and intermediate points (MIP) across which continuity check, link trace, and loopback tests can be performed as needed to validate connection integrity. The IEEE 802.3ah is designed for testing and maintaining access links. It includes a set of discovery, link monitoring, remote failure detection, and remote loopback protocols. The ITU Y1731 standard extends beyond CFM (802.1ag) to support performance monitoring and testing of key Ethernet service attributes, including frame loss, frame delay, and frame delay variation, which are necessary for ensuring conformance to SLAs and verifying end to end service quality.

The SD-WAN module of node 502 may integrate OAM functions provided by the OAM standards to make intelligent routing decisions. Although the embodiments of the present disclosure are described in detail with respect to MEP, any other node can be configured to implement the teaching of the present disclosure.

Figure 6:
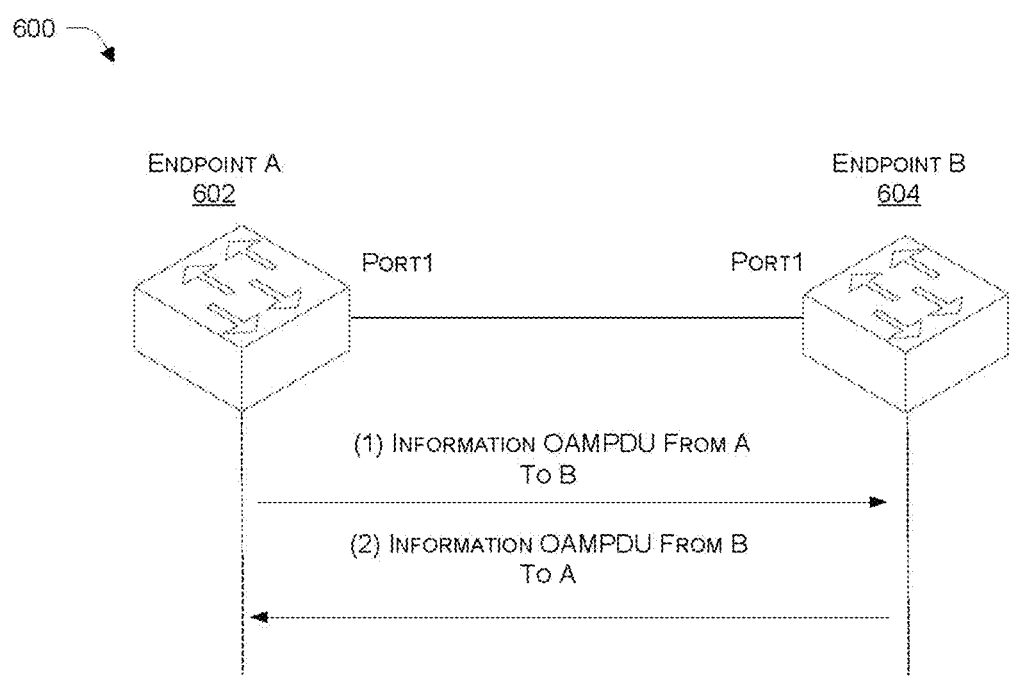
FIG. 6 is a sequence diagram illustrating an example OAM information exchange between two network devices for collecting Ethernet level information in accordance with an embodiment of the present disclosure.

FIG. 6 is a sequence diagram illustrating an example OAM information exchange between two network devices for collecting Ethernet level information in accordance with an embodiment of the present disclosure. In order to obtain OAM information, the network devices, for example, endpoint 602 and endpoint 604, may first establish an OAM connection (session). An OAM entity (endpoint 602 and endpoint 604) can operate in two modes: active and passive. Only the active OAM entity can initiate an OAM connection, and the passive OAM entity waits and responds to OAM connection establishment requests. So at least one of the two entities should be in active mode. In the context of the present example, the OAM entities have established an OAM connection over ethernet port 1. In an embodiment, endpoint A 602 initiates an OAM connection by sending an Information OAM Protocol Data unit (OAMPDU). Endpoint B 604 compares the OAM information in the received OAMPDU with its own and sends back an Information OAMPDU to endpoint A 602. If the OAM information of the two entities matches, an OAM connection will be established. After that, the two OAM entities keep exchanging Information OAMPDUs periodically to keep the OAM connection valid. Once the OAM connection is established, the endpoints may get OAM information using OAM protocols.

Figure 7:
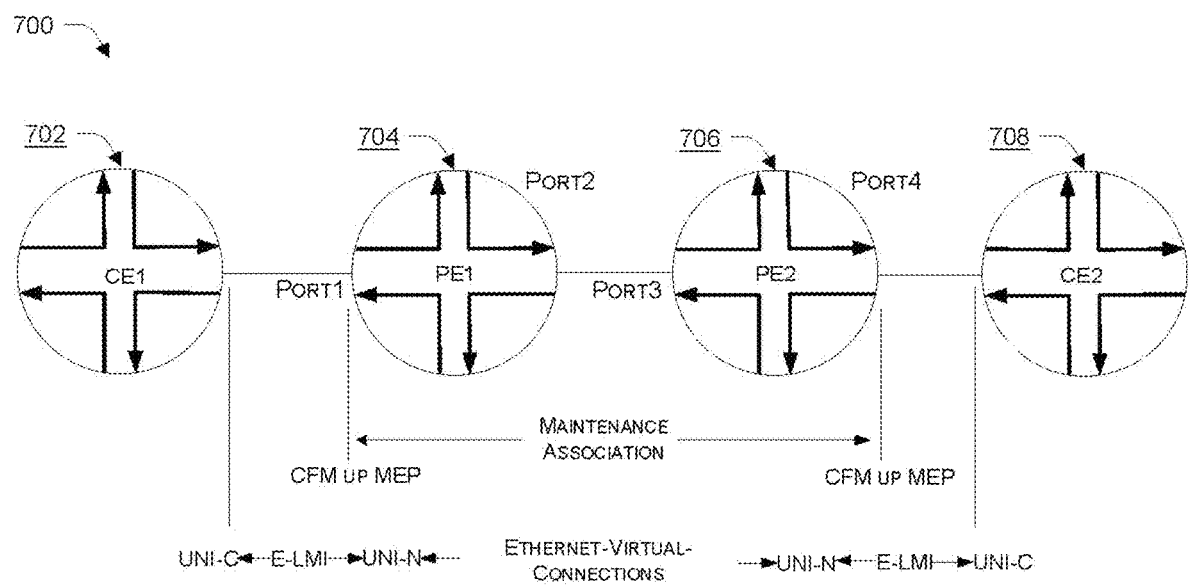
FIG. 7 illustrates the Ethernet Local Management Interface (E-LMI) configuration for a point-to-point EVC (SV-LAN) monitoring by connectivity fault management (CFM) module in accordance with an embodiment of the present disclosure.

FIG. 7 illustrates the Ethernet Local Management Interface (E-LMI) configuration for a point-to-point EVC (SV-LAN) monitoring by connectivity fault management (CFM) module in accordance with an embodiment of the present disclosure. Before obtaining the OAM information, customer edge (CE) (e.g., CE1 702, and CE2 708) and network provider edge (e.g., PE1 704 and PE2 706) Ethernet local management Interfaces need to be configured. User-Network Interface (UNI) of Customer edge (CE), referred to as UNI-C can be configured to provide customer edge side functions. The UNI-C is configured for formatting the frames in ETH format, C-tagging the frames per the service definition, C-tagging the frames per the service definition, and C-tagging the frames per the service definition. Similarly, the user-network interface of a service provider (referred to as UNI-N) can be configured for exchanging data frames with UNI-C, mapping service frames to and from the EVCs, enforcing ingress and bandwidth profiles, and color marking, performing OAM functions, and provide optional CE-VLAN ID manipulation. E-LMI can be configured between the customer edge (also referred to as MEP in the context of the OAM protocols) and the service provider edge (also referred to as MIP in the context of the OAM protocol). The service provider edges (PE1 704 and PE2 706) may have a maintenance association and may exchange the OAM information.

Figure 8:
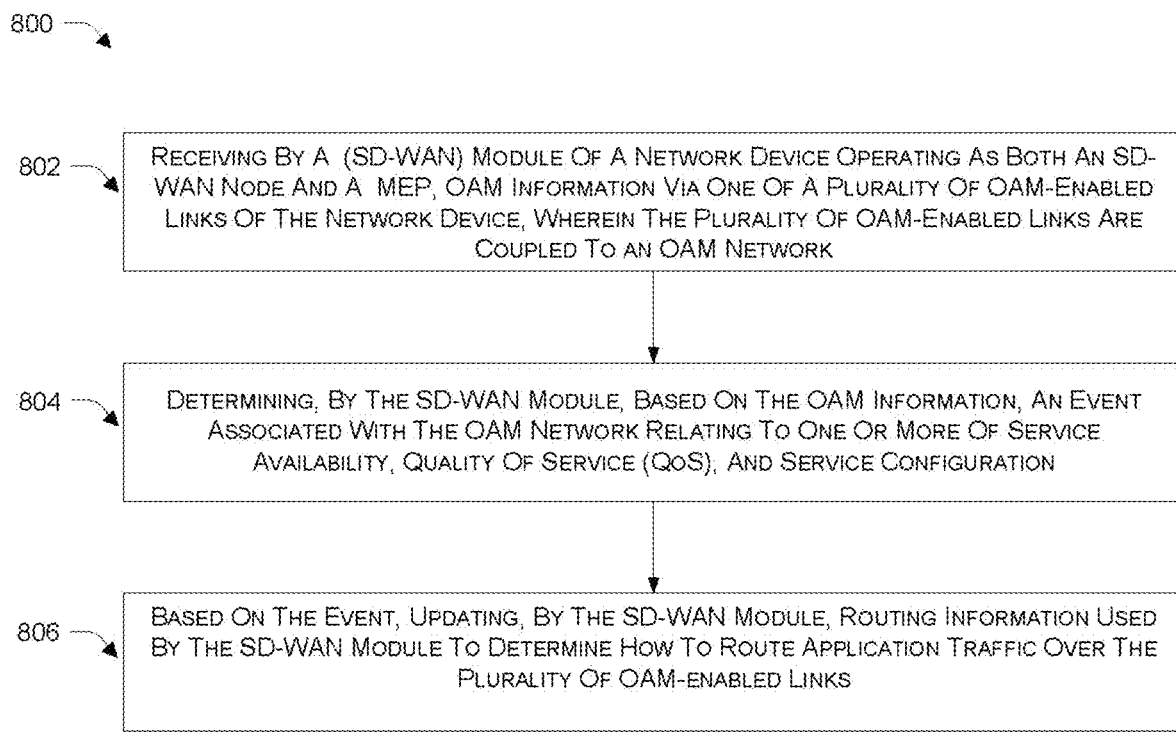
FIG. 8 is an example flow diagram illustrating a process followed by a network device for enabling an SD-WAN module to respond to Ethernet level operation, administration, and maintenance (OAM) related issues and events in accordance with an embodiment of the present disclosure.

FIG. 8 is an example flow diagram illustrating a process followed by a network device for enabling an SD-WAN module to respond to Ethernet level operation, administration, and maintenance (OAM) related issues and events in accordance with an embodiment of the present disclosure. As shown in FIG. 8, the process 800 includes the steps of receiving by an SD-WAN module of a network device, operating as both an SD-WAN node and an MEP, OAM information via one of a plurality of OAM-enabled links of the network device as shown at block 802. The OAM-enabled links connect the network device to an OAM network. The OAM information is receiving using functionalities of existing OAM protocols, such as IEEE 802.3ah, IEEE 802.1ag, and ITU Y1731. Process 800 includes a step of determining, by the SD-WAN module, based on the OAM information, an event associated with the OAM network relating to one or more of service availability, Quality of Service (QoS), and service configuration, as shown at block 804. Process 800 further includes a step of updating by the SD-WAN module, routing information used by the SD-WAN module to determine how to route application traffic over the plurality of OAM-enabled links, based on the determined event.

Figure 9:
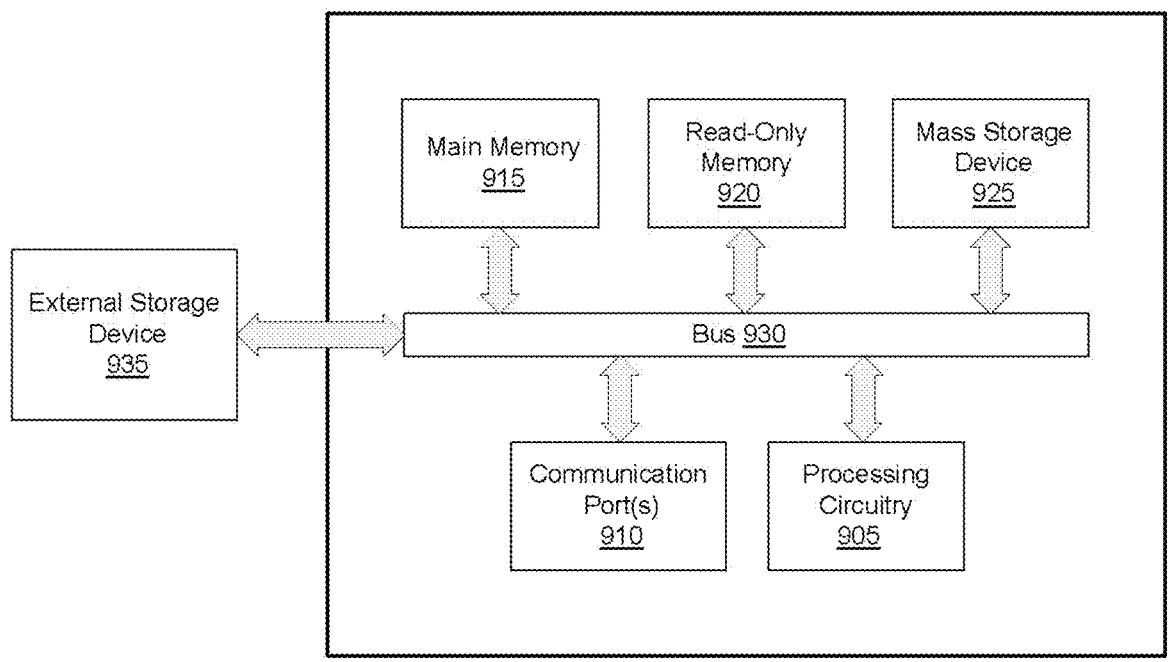
FIG. 9 illustrates an exemplary computer system in which or with which embodiments of the present disclosure may be utilized.

FIG. 9 illustrates an exemplary computer system 900 in which or with which embodiments of the present disclosure may be utilized. As shown in FIG. 9, the computer system includes an external storage device 940, a bus 930, a main memory 920, a read-only memory 920, a mass storage device 925, one or more communication ports 910, and one or more processing resources (e.g., processing circuitry 905). In one embodiment, computer system 900 may represent some portion of customer equipment (e.g., customer equipment 102 or 106) or a network device (e.g., network device 200, 302, 402, 452, 502, 506, 602, 604, 700, or 702).

Those skilled in the art will appreciate that computer system 900 may include more than one processing resource and communication port 910. Non-limiting examples of processing circuitry 905 include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processor 970 may include various modules associated with embodiments of the present disclosure.

Communication port 910 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 760 may be chosen depending on a network, such as a Local Area Network (LAN), Wide Area Network (WAN), or any network to which the computer system connects.

Memory 915 can be Random Access Memory (RAM), or any other dynamic storage device commonly known in the art. Read only memory 920 can be any static storage device(s) e.g., but not limited to, a Programmable Read Only Memory (PROM) chips for storing static information e.g. start-up or BIOS instructions for the processing resource.

Mass storage 925 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 930 communicatively couples processing resource(s) with the other memory, storage and communication blocks. Bus 930 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 930 to support direct operator interaction with computer system. Other operator and administrative interfaces can be provided through network connections connected through communication port 960. External storage device 604 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named. While the foregoing describes various embodiments of the disclosure, other and further embodiments may be devised without departing from the basic scope thereof.

What is claimed is:

1. A network device operable to serve as both a Software-Defined Network Wide Area Network (SD-WAN) node and an Operation, Administration and Maintenance (OAM) Maintenance Entity Group Endpoint (MEP), the network device comprising:
    a processing resource;
    an SD-WAN module; and
    a non-transitory computer-readable medium, coupled to the processing resource, having stored therein instructions that when executed by the processing resource cause the processing resource to:
        receive, by the SD-WAN module, OAM information via one of a plurality of OAM-enabled links of the network device, wherein the plurality of OAM-enabled links are coupled to an OAM network;
        determine, by the SD-WAN module, based on the OAM information, an event associated with the OAM network relating to one or more of service availability, Quality of Service (QOS), and service configuration; and
        based on the event, update, by the SD-WAN module, routing information used by the SD-WAN module to determine how to route application traffic over the plurality of OAM-enabled links.

2. The network device of claim 1, wherein the OAM information is indicative of:
    a performance measurements associated with the link;
    a status change of the link, a Maintenance Entity Group Intermediate Point (MIP) of the OAM network, or a peer MEP;
    a configuration issue; or
    addition or activation of a new link to the plurality of OAM-enabled links.

3. The network device of claim 1, wherein the SD-WAN module tightly integrates OAM functionalities and wherein the OAM information is received by the SD-WAN module from one or more of the OAM functionalities.

4. The network device of claim 1, further comprising an OAM module, wherein the OAM information is received by the SD-WAN module from the OAM module.

5. The network device of claim 4, wherein the OAM information is received by the SD-WAN module responsive to a function call issued by the SD-WAN module to the OAM module.

6. The network device of claim 5, wherein the function call causes the OAM module to (i) test connectivity of the MEP with a MIP of the OAM network or with a peer MEP via a link of the plurality of OAM-enabled links; or (ii) measure latency, jitter, and frame loss on the link by performing a loopback check and/or by performing a performance management function.

7. The network device of claim 5, wherein the function call causes the OAM module to (i) identify a service misconfiguration, (ii) test for loss of connectivity to a location, a device failure, or a data plane loop by performing a continuity check.

8. The network device of claim 4, wherein the OAM information is received by the SD-WAN module as a result of proactive monitoring performed by the OAM module.

9. The network device of claim 1, wherein the OAM network implements one or more of a current or future version of Institute of Electrical and Electronics Engineers (IEEE) 802.1ag Connectivity Fault Management (CFM) protocol or a current or future version of International Telecommunication Union (ITU) Y.1731 protocol.

10. The network device of claim 9, wherein the ITU Y.1731 protocol is used for any or combination of Alarm Indication Signal (AIS), Ethernet Lock Signal (LCK), check multicast loopback, measure frame delay, and perform loss measurement using Y.1731 performance management functions.

11. The network device of claim 1, wherein the OAM information is used by the SD-WAN module to perform health-checks.

12. A method comprising:
    receiving by a Software-Defined Network Wide Area Network (SD-WAN) module of a network device operating as both an SD-WAN node and an Operation, Administration and Maintenance (OAM) Maintenance Entity Group Endpoint (MEP), OAM information via one of a plurality of OAM-enabled links of the network device, wherein the plurality of OAM-enabled links are coupled to an OAM network;
    determining, by the SD-WAN module, based on the OAM information, an event associated with the OAM network relating to one or more of service availability, Quality of Service (QOS), and service configuration; and
    based on the event, updating, by the SD-WAN module, routing information used by the SD-WAN module to determine how to route application traffic over the plurality of OAM-enabled links.

13. The method of claim 12, wherein the OAM information is indicative of:
    a performance measurements associated with the link;
    a status change of the link, a Maintenance Entity Group Intermediate Point (MIP) of the OAM network, or a peer MEP;
    a configuration issue; or
    addition or activation of a new link to the plurality of OAM-enabled links.

14. The method of claim 12, wherein the SD-WAN module tightly integrates OAM functionalities and wherein the OAM information is received by the SD-WAN module from one or more of the OAM functionalities.

15. The method of claim 12, wherein the network device includes an OAM module and wherein the OAM information is received by the SD-WAN module from the OAM module.

16. The method of claim 15, wherein the OAM information is received by the SD-WAN module responsive to a function call issued by the SD-WAN module to the OAM module.

17. The method of claim 16, wherein the function call causes the OAM module to (i) test connectivity of the MEP with a MIP of the OAM network or with a peer MEP via a link of the plurality of OAM-enabled links; or (ii) measure latency, jitter, and frame loss on the link by performing a loopback check and/or by performing a performance management function.

18. The method of claim 16, wherein the function call causes the OAM module to (i) identify a service misconfiguration, (ii) test for loss of connectivity to a location, a device failure, or a data plane loop by performing a continuity check.

19. The method of claim 15, wherein the OAM information is received by the SD-WAN module as a result of proactive monitoring performed by the OAM module.

20. A non-transitory computer-readable storage medium embodying a set of instructions, which when executed by one or more processors of a network device operable to serve as both a Software-Defined Network Wide Area Network (SD-WAN) node and an Operation, Administration and Maintenance (OAM) Maintenance Entity Group Endpoint (MEP), causes the one or more processors to perform a method comprising:
receiving OAM information via one of a plurality of OAM-enabled links of the network device, wherein the plurality of OAM-enabled links are coupled to an OAM network;
determining based on the OAM information, an event associated with the OAM network relating to one or more of service availability, Quality of Service (QoS), and service configuration; and
based on the event, updating routing information used by the SD-WAN module to determine how to route application traffic over the plurality of OAM-enabled links.

* * * * *